United States Patent
Yun et al.

(10) Patent No.: US 7,133,231 B2
(45) Date of Patent: Nov. 7, 2006

(54) METHOD AND APPARATUS FOR RECORDING DATA ON HARD DISK DRIVE, AND STORAGE MEDIUM THEREFOR

(75) Inventors: Jong-yun Yun, Suwon-si (KR); Sun-hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 11/063,558

(22) Filed: Feb. 24, 2005

(65) Prior Publication Data

US 2005/0188153 A1   Aug. 25, 2005

(30) Foreign Application Priority Data

Feb. 25, 2004   (KR) ................ 10-2004-0012545

(51) Int. Cl.
*G11B 15/04* (2006.01)
(52) U.S. Cl. ............ 360/60; 360/78.01; 360/31
(58) Field of Classification Search ............ 360/60, 360/78.01, 58, 55, 75, 77.02, 77.06, 77.07, 360/78.04, 46, 31, 78.14, 77.11; 369/53.31, 369/53.26, 275.3; 711/158
See application file for complete search history.

(56) References Cited

U.S. PATENT DOCUMENTS

| | | | | |
|---|---|---|---|---|
| 3,187,317 A | * | 6/1965 | Smith, Jr. ............ | 360/77.11 |
| 3,539,716 A | * | 11/1970 | Poulett et al. ............ | 386/66 |
| 5,228,020 A | * | 7/1993 | Shiragami et al. ........ | 369/47.48 |
| 5,638,534 A | * | 6/1997 | Mote, Jr. ............ | 711/158 |
| 5,949,747 A | * | 9/1999 | Miyashita et al. ........ | 369/53.26 |
| 5,986,847 A | * | 11/1999 | Le et al. ............ | 360/78.14 |
| 6,038,209 A | * | 3/2000 | Satoh ............ | 369/275.3 |
| 6,646,968 B1 | * | 11/2003 | Miyaoka ............ | 369/53.31 |
| 2004/0190185 A1 | * | 9/2004 | Lee ............ | 360/75 |
| 2005/0190476 A1 | * | 9/2005 | Wilson et al. ............ | 360/46 |
| 2006/0056091 A1 | * | 3/2006 | Nagano et al. ............ | 360/55 |
| 2006/0098318 A1 | * | 5/2006 | Feng ............ | 360/31 |

FOREIGN PATENT DOCUMENTS

| | | |
|---|---|---|
| JP | 8-63898 | 3/1996 |
| JP | 10-154381 | 6/1998 |
| JP | 2000-173005 | 6/2000 |
| JP | 2001-126202 | 5/2001 |

* cited by examiner

*Primary Examiner*—Fred F. Tzeng
(74) *Attorney, Agent, or Firm*—Staas & Halsey LLP

(57) ABSTRACT

A method of and an apparatus for recording data on a hard disk drive, and a storage medium containing a program for executing the method. Data is recorded on a track in a recording region and an address of a next track to be recorded with the data is determined so that the next track to be recorded with the data is located more than one track away from the previously recorded track so that the recorded data has robustness to adjacent track erasure and overwrite erasure.

19 Claims, 6 Drawing Sheets

METHOD AND APPARATUS FOR RECORDING DATA ON HARD DISK DRIVE, AND STORAGE MEDIUM THEREFOR

CROSS-REFERENCE TO RELATED APPLICATIONS

This application claims the priority of Korean Patent Application No. 2004-12545, filed on Feb. 25, 2004, in the Korean Intellectual Property Office, the disclosure of which is incorporated herein by reference.

BACKGROUND OF THE INVENTION

1. Field of the Invention

The present invention relates to a method of recording data on a hard disk drive, and more particularly, to a method of and an apparatus for recording data, by which the recorded data has robustness to an adjacent track erase and an off-track erase, and a storage medium comprising instructions for executing the method.

2. Description of the Related Art

A hard disk drive is a recording apparatus for storing information. Information is generally recorded on concentric tracks in either surface of at least one magnetic disk. The disk is rotatably loaded on a spindle motor, and the information is accessed by a reading/writing head mounted on an actuator arm rotated by a voice coil motor. The voice coil motor receives a current to rotate the actuator, thereby shifting the head. The reading/writing head detects a change of a magnetic field radiated from a surface of the disk to read information recorded on the surface of the disk. In order to record the information on a data track, a current is fed to the head. The electrical current generates a magnetic field to magnetize the surface of the disk.

As a capacity of the hard disk drive increases, a track density becomes greater and an interval between tracks becomes narrower. Therefore, adjacent tracks are affected by a recording magnetic field generated when data is recorded on the track, so that it is more likely that the data recorded on the adjacent tracks is damaged.

The recording density may be increased by shortening a distance between the head and the disk. If the distance between the head and the disk is shortened, the data recorded in the adjacent tracks may be damaged by the recording magnetic field generated by the head.

Such a phenomenon is referred to as adjacent track erase (ATE), and it matters when the recording current applied to the head is too high. Meanwhile, the ATE may be worse by a reduction of coercivity of a medium.

FIG. 1 is a view depicting an effect resulting from ATE. Three tracks are shown in FIG. 1. White portions are indicative of regions recorded with the data in each track. FIG. 1 shows a state of an intermediate track when data is recorded on upper and lower tracks. It is apparent from FIG. 1 that the data recorded in the intermediate track is more damaged than data recorded in the upper and lower tracks. Such results are caused due to ATE, by which data recorded in the intermediate track is erased when data are recorded in the upper and lower tracks.

In order to address the above problem, recent hard disk drives suppress the occurrence of the ATE by measuring an operating temperature of the drive to control a write current or overshoot current according to the measured temperature.

In particular, by using a lower write current and overshoot current at a temperature higher than at room temperature, some of the ATE may be prevented.

In such a method of optimizing the recording current, it is difficult to prevent all of the ATE due to repeated recording of data on a same track.

To provide a time shift function, in recently developed personal video recorders (PVRs), a specific region of a hard disk drive is continuously and repeatedly recorded so that the specific region is more affected by ATE. The time shift function means that an amount of an input broadcast stream corresponding to a predetermined period is buffered during a determined period of time to be provided upon request by a user. To this end, the PVR continuously and repeatedly records the broadcast stream input to the region allocated for the purpose of time shift in the hard disk drive. In this case, since the region is continuously and repeatedly used during the activated period for the time shift function, for example, over 24 hours, the data in the region is likely to be damaged by cumulative effects.

In addition to the ATE, the phenomenon that the data recorded in the adjacent track is erased may happen by off-track erasure (OTE). The OTE is due to a deviation of a recording head from a center of the track during the recording of data.

FIG. 2 is a view depicting an effect resulting from the OTE. Three tracks are shown in FIG. 2, in which white portions are indicative of regions recorded with the data in each track. FIG. 2 shows a state of an intermediate track when the data is recorded in an upper track. It is apparent from FIG. 2 that a portion of data from the data recorded in the middle and upper tracks is shifted to a bottom area relative to that of a lower track. Such results are caused by the OTE occurring in the portion where the data is recorded in the tracks, in which off-track data is in the upper track and a portion of the data is erased in the intermediate track.

Although the OTE is related mainly to a precision of a servo control, it is also related to an external impact applied to the hard disk drive, eccentricity of the disk or the like.

In order to prevent the recorded data from being damaged due to the ATE or OTE, a method of reducing an interval between the tracks in a specific position or recording backup information periodically has been utilized, this method leads to an overhead in data processing.

SUMMARY OF THE INVENTION

The present invention provides a method of recording data having robustness to ATE and/or OTE.

The present invention also provides an apparatus for recording data while minimizing the ATE and/or the OTE.

The present invention provides a storage medium which stores instructions to be read by a computer to execute the recording method.

According to an aspect of the present invention, there is provided a method of recording data on a hard disk drive including a plurality of tracks, the method comprising: recording the data on the tracks; and determining an address of a next track to be recorded with the data, the next track being located more than one track away from a previously recorded track so that the recorded data has robustness to adjacent track erasure and overwrite erasure.

According to another aspect of the present invention, there is provided an apparatus for recording data on a hard disk drive, the apparatus comprising a buffer for buffering the data to be recorded; a data output unit for reading buffered data to be recorded on a track with reference to an address of a recorded track; and a unit for determining the address of the recorded track to be outputted to the data output unit, in which a next track to be recorded with the data is located more than one track away from a previously recorded track so that the recorded data has robustness to adjacent track erasure and overwrite erasure.

According to another aspect of the present invention, there is provided a computer-readable storage medium storing a program for executing a method of recording data on a hard disk drive comprising a plurality of tracks, the method comprising recording the data on the tracks; and determining an address of a next track to be recorded with the data, the next track being located more than one track away from a previously recorded track so that the recorded data has robustness to adjacent track erasure and overwrite erasure.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE PREFERRED EMBODIMENTS

Figure 1:
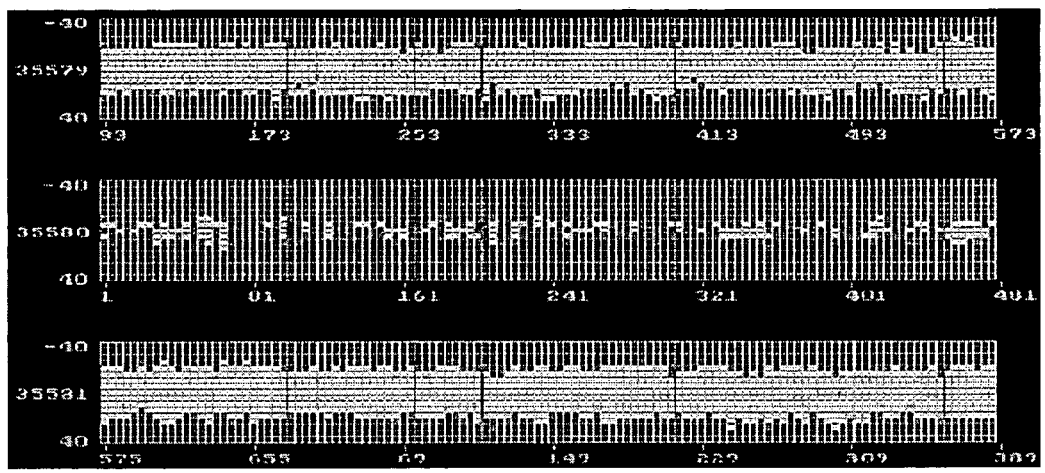
FIG. 1 is a view depicting an effect resulting from ATE.
Figure 2:
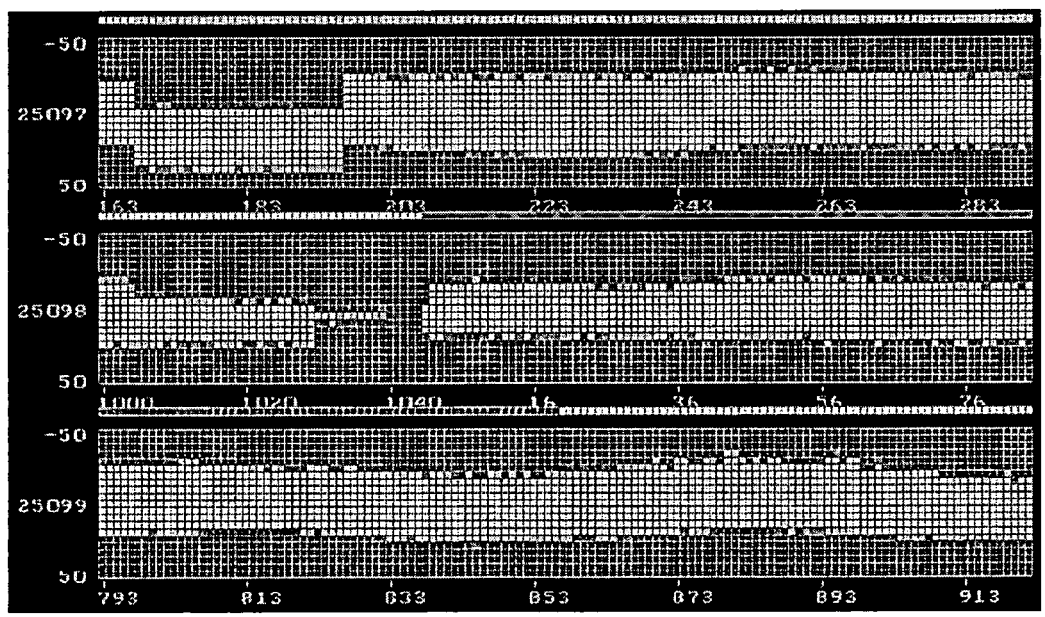
FIG. 2 is a view depicting an effect resulting from OTE.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
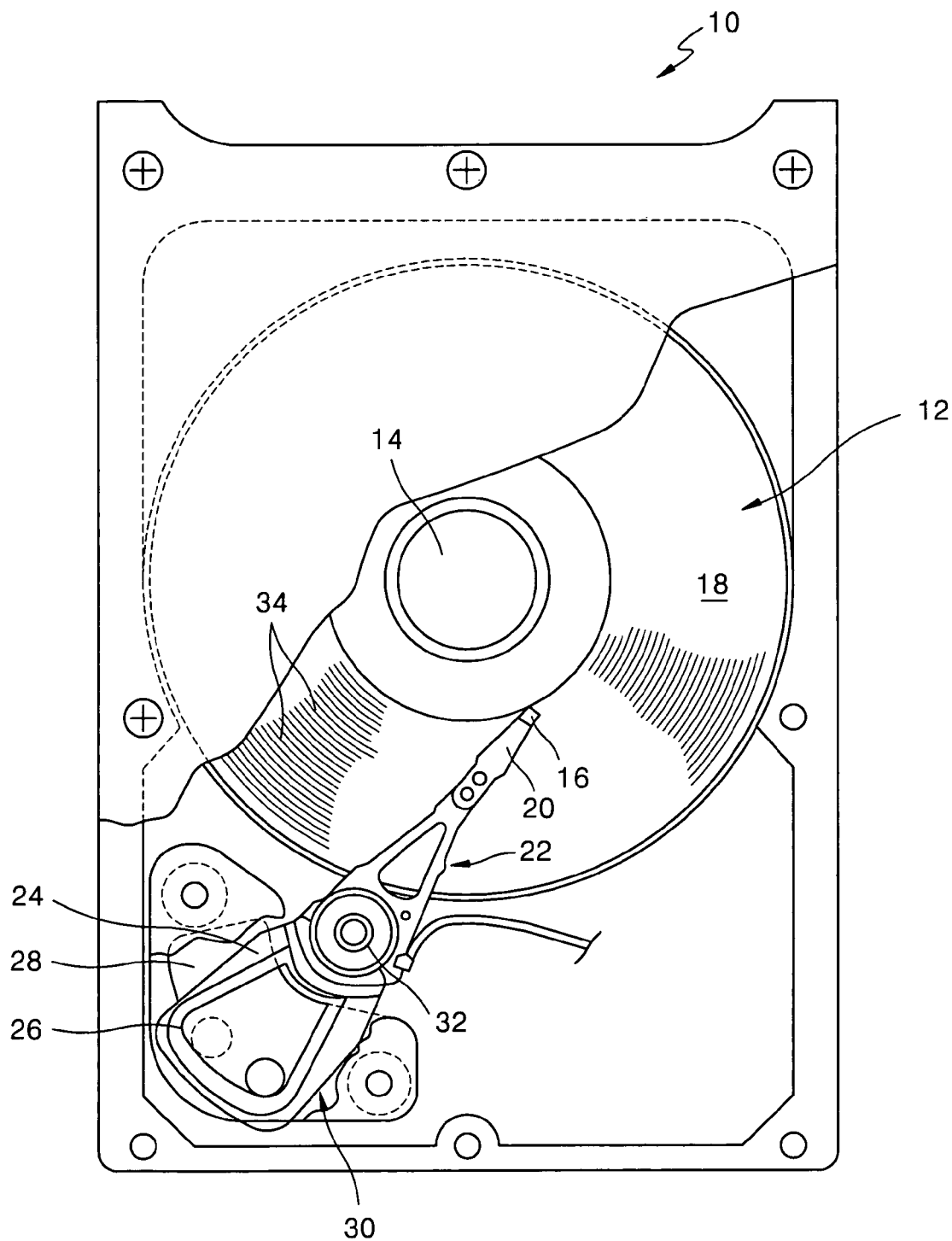
FIG. 3 is a schematic view of an example of a hard disk drive.

FIG. 3 is a schematic view of an example of a hard disk drive. Referring to FIG. 3, a hard disk drive 10 comprises a disk 12 rotated by a spindle motor 14, and a head 16 to access the disk 12, moving at a desired interval from a surface 18 of the disk 12.

The disk 12 is rotated by the spindle motor 14, and the head 16 converts electrical information into magnetic information and vice versa to write and read the data to and from the disk 12. Although only one head 16 is shown in FIG. 3, a write head for converting the electrical information into the magnetic information and a read head for converting the magnetic information into electrical information are generally provided as in a single member.

The head 16 may be integrated with a slider 20. The slider 20 is adapted to produce an air bearing between the head 16 and the surface 18 of the disk 12. Alternatively, the slider 20 may be integrated with a head gimbal assembly (HGA) 22. The HGA 22 is attached to an actuator arm 24 having a voice coil 26.

A voice coil motor (VCM) 30 includes the voice coil 26 and a magnet assembly 28. When a current is applied to the voice coil 26, a torque is generated to rotate the actuator arm 24 around a bearing assembly 32. As such, the head 16 is moved across the surface 18 of the disk 12 by the rotation of the actuator arm 24.

Information is recorded on circular tracks 34 of the disk 12. Each of the tracks 34 comprises a plurality of sectors. Each of the sectors comprises a user data region and a servo data region. The servo data region is recorded with a Gray Code for identifying sectors or tracks (or cylinders), a servo burst signal for controlling a head position, and the like.

Figure 4:
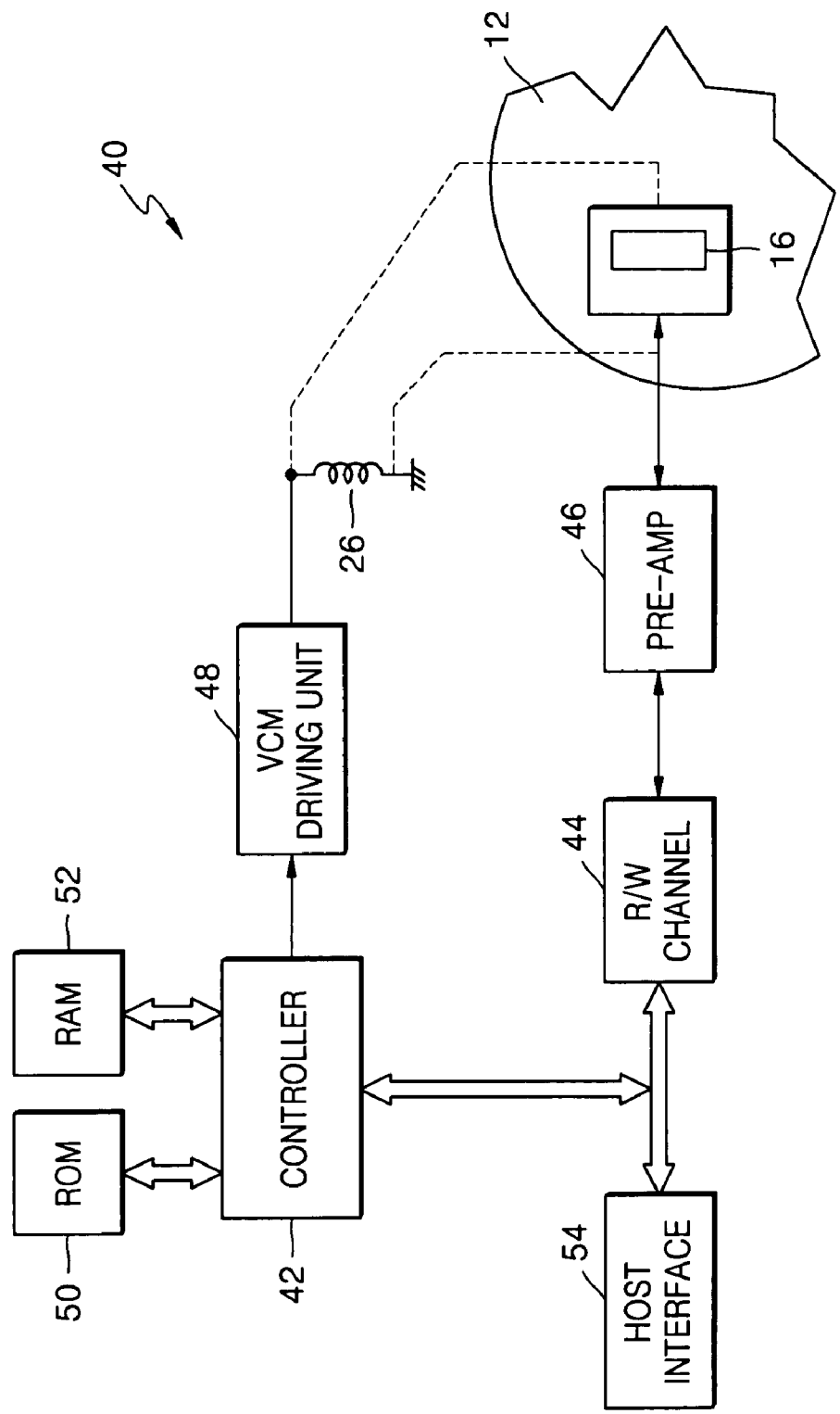
FIG. 4 is a block diagram illustrating an electric system for controlling the hard disk drive shown in FIG. 3.

FIG. 4 is a block diagram illustrating an electric system 40 for controlling the hard disk drive 10 shown in FIG. 3. As shown in FIG. 4, the electric system 40 comprises a controller 42 electrically coupled to the head 16 via a read/write (R/W) channel circuit 44 and a pre-amplifier circuit 46. The controller 42 may be implemented with a digital signal processor (DSP), a microprocessor, a micro-controller, or the like. The controller 42 sends a control signal to the read/write channel circuit 44 to read the information from the disk 12 or write the information on the disk 12.

The information is transferred between the read/write channel circuit 44 and a host interface circuit 54. The host interface circuit 54 comprises a control circuit for controlling an interface between the hard disk drive 10 and a host system (not shown), such as for example, a personal computer, and a buffer memory for buffering the information transferred between the hard disk drive 10 and the host system.

The controller 42 is also connected to a VCM driving unit 48 for supplying a driving current to the voice coil 26. The controller 42 sends a control signal to the VCM driving unit 48 to control the shift of the head 16.

The controller 42 is connected to a nonvolatile memory device, such as a read only memory (ROM) or a flash memory device 50, and a random access memory (RAM) device 52. The memory devices 50 and 52 store commands or data used for enabling the controller 42 to carry out a software routine.

Figure 5:
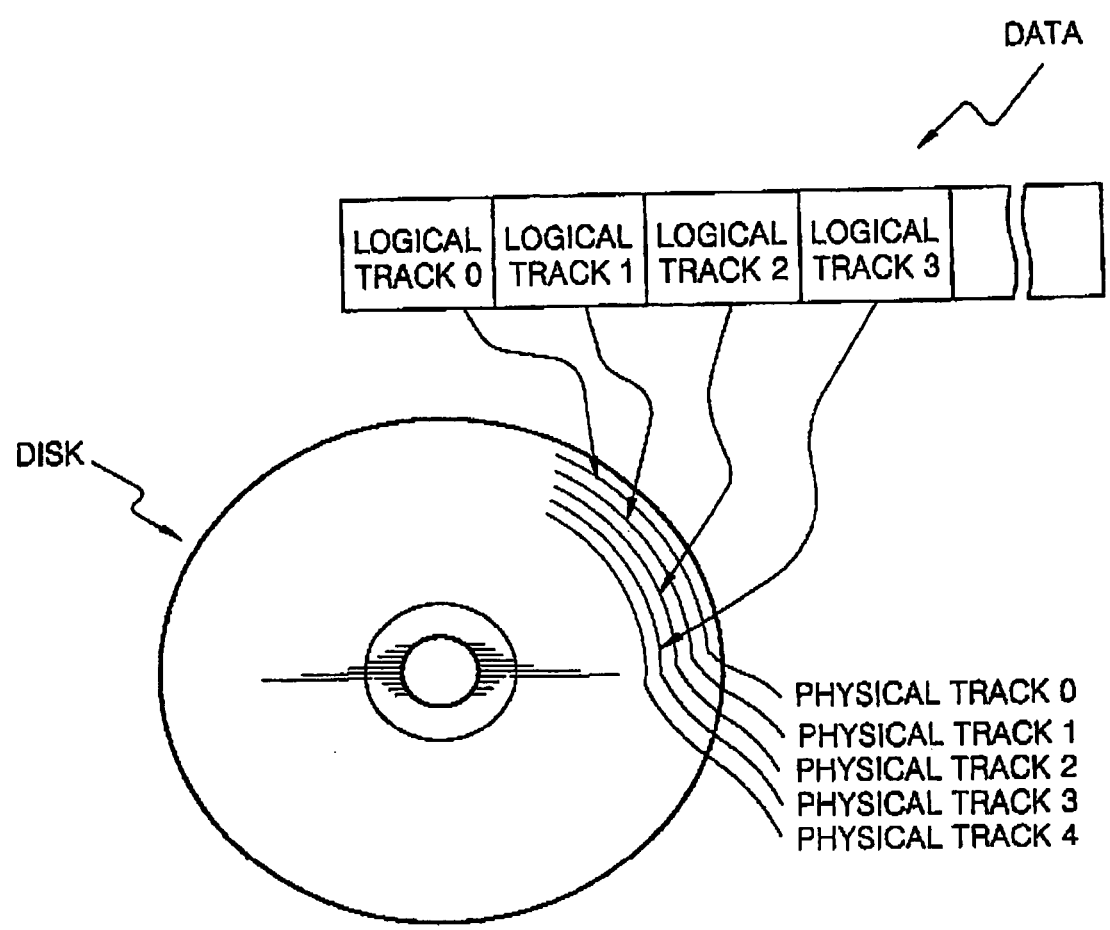
FIG. 5 is a schematic view illustrating a conventional method of recording data.

FIG. 5 is a schematic view illustrating a conventional data recording method. Referring to FIG. 5, data is divided and recorded in tracks, and each of the tracks has sequentially allocated logical address. As widely known in the art, the hard disk drive includes a plurality of tracks each having a physical address.

The physical address of the track is sequentially increased radially inward from an outer diameter of the disk. When data is recorded, the data is sequentially recorded radially inward from the outer diameter of the disk.

Referring to FIG. 5, according to the conventional method, in which a logical track 0 is recorded on a physical track 0 and a logical track 1 is recorded on a physical track 1, after the data is recorded on one track, the data is continuously recorded on the track adjacent to the previously recorded track. As such, an interval between a previously recorded track and a currently recorded track corresponds to a track pitch, so that the method is not robust to ATE and OTE.

Figure 6:
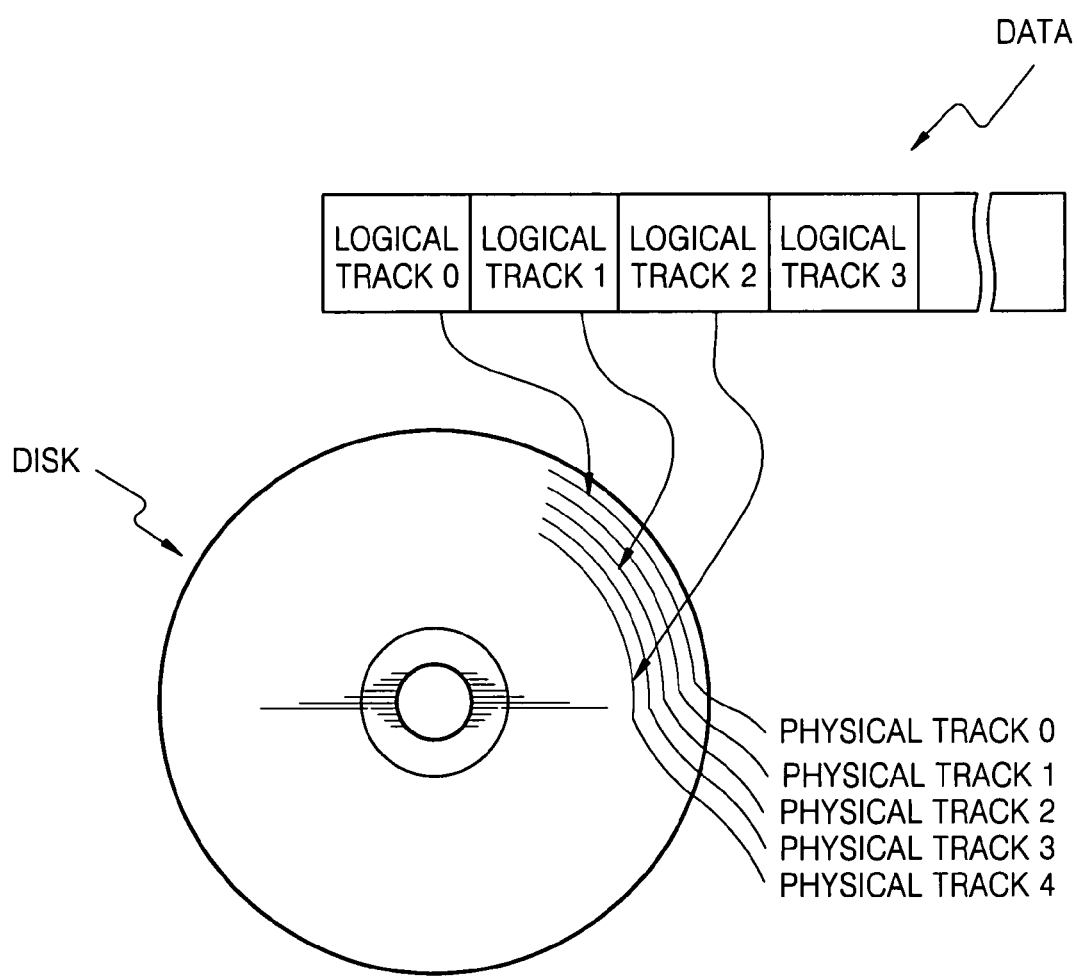
FIG. 6 is a schematic view illustrating a method of recording data according to an embodiment of the present invention.

FIG. 6 is a schematic view illustrating a data recording method according to an embodiment of the present invention. According to a feature of the data recording method of the present invention, after data is recorded on a track, data is not recorded on an immediately adjacent track, but is recorded on a next adjacent track at least one track away from the immediately adjacent track, that is, more than one track away from the previously recorded track.

Referring to FIG. 6, according to the data recording method of the present invention, after data is recorded on one track, data is continuously recorded on a next track at least more than one track away from the previously recorded track. Specifically, a logical track 0 is recorded on a physical track 0, but a logical track 1 is recorded on a physical track 2. As such, an interval between a previously recorded track and a currently recorded track corresponds to at least two times a track pitch, so that the method is robust to ATE and OTE.

The determination of the next track to be recorded depends upon a basic interval (n is a constant above 2). Data is recorded by skipping at least one track, and if it reaches an end of a recordable region, on which the data is recorded, the recording returns to a beginning of the recordable region. Then, the data recording starts from a track next to the track firstly recorded.

The method of skipping one track to record data on the track results in doubling of a track pitch, thereby increasing an effect of preventing an erase of adjacent tracks. Taking into consideration that most of users hardly use the entire capacity of the hard disk drive, the method of the present invention is very effective.

An overwrite ability of the head has a tendency to be increased due to continuous data recording. Specifically, the head is heated by continuously applying writing current to the head, and thus, there is a difference between an initial overwrite ability and a subsequent overwrite ability. If the data recording is carried out by skipping a track as in the present invention, the head is cooled while the head moves to the next recording track, thereby reducing the overwrite and also, the ATE and OTE phenomena.

For example, one method of determining the address of the track is as follows.

Where the number of total tracks is 1000, and the track interleave n is 2,
if target logical Cyl.<MaxCyl./n
physical Cyl=target logical Cyl*n+0,
Else,
physical Cyl=(target logical Cyl−(Total Cyl/n))*n+1.

Sample results of physical cylinder address determination where total tracks are 1000 and the track interleave is 2 are shown in Table 1.

TABLE 1

| Target Logical Cylinder | Calculation | Physical Cylinder |
|---|---|---|
| Track 0 | 0*2 | Track 0 |
| Track 500 | (500 − (1000/2))*2 + 1 | Track 1 |
| Track 1 | 1*2 | Track 2 |
| Track 501 | (501 − (1000/2))*2 + 1 | Track 3 |
| Track 2 | 2*2 | Track 4 |
| Track 502 | (502 − (1000/2))*2 + 1 | Track 5 |
| Track 998 | (998 − (1000/2))*2 + 1 | Track 997 |
| Track 449 | 449*2 | Track 998 |
| Track 999 | (999 − (1000/2))*2 + 1 | Track 999 |

Where the number of total tracks is 18, and track interleave n is 3, case 1
target logical Cyl.<TotalCyl./n
physical cyl=target logical Cyl*n+0, Case 2
totalCyl/n<=target logical Cyl.<(n−1)*totalCyl./n
physical Cyl=(target logical Cyl−(total Cyl/n))*n+1, Case 3
target logical Cyl>=(n−1)*totalCyl/n
physical Cyl=(target logical cyl−((n−1)*TotalCyl/n))*n+2.

Sample results of physical cylinder address determination where total tracks are 18 and the track interleave is 3 are shown in Table 2.

TABLE 2

| Target Logical Cylinder | Case | Calculation | Physical Cylinder |
|---|---|---|---|
| Track 0 | 1 | 0*3 | Track 0 |
| Track 6 | 2 | (6 − (18/3))*3 + 1 | Track 1 |
| Track 12 | 3 | (12 − (2*18/3))*3 + 2 | Track 2 |
| Track 1 | 1 | 1*3 | Track 3 |
| Track 7 | 2 | (7 − (18/3))*3 + 1 | Track 4 |
| Track 13 | 3 | (13 − (2*18/3))*3 + 2 | Track 5 |
| Track 5 | 1 | 5*3 | Track 15 |
| Track 11 | 2 | (11 − (18/3))*3 + 1 | Track 16 |
| Track 17 | 3 | (17 − (2*18/3))*3 + 2 | Track 17 |

Figure 7:
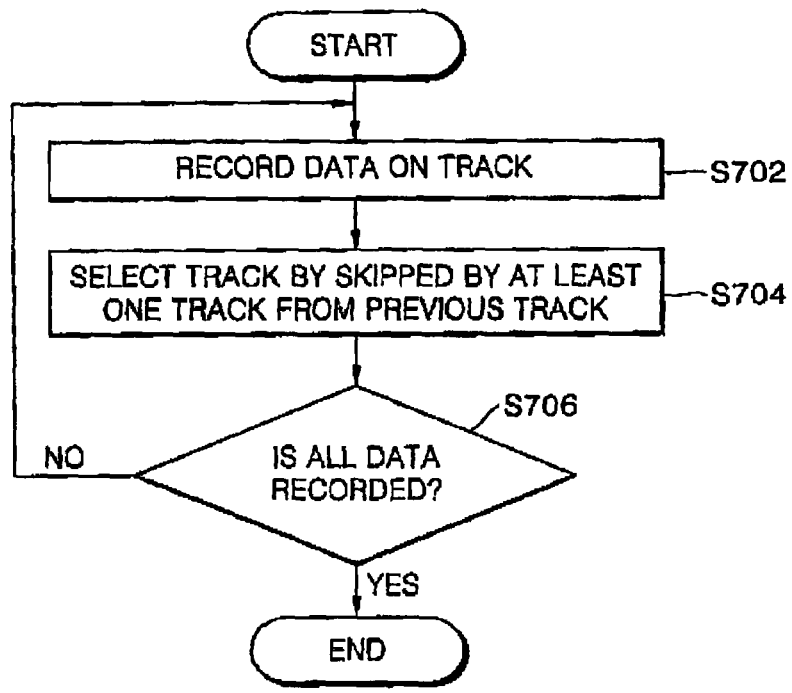
FIG. 7 is a flowchart illustrating the method of recording data according to the embodiment of the present invention.

FIG. 7 is a flowchart illustrating a method of recording data according to the embodiment the present invention.

When data recording starts, data is recorded on a first track of a recordable region to be recorded with data at operation S702.

A next track to be recorded is designated at operation S704. The next track is designated to be more than one track away from a previously recorded track.

In the case that the track recorded with data is positioned at an end of the recordable region and thus, a next designated track, apart from the previous track by a designated interval, is positioned out of the recordable region, data recording returns to a beginning of the recordable region, and a track adjacent to the track firstly recorded is designated. Here, the adjacent track means that, like in the above example in which the track interval is 3, a second track from the beginning of the recordable region is selected in the case that it is second-repeatedly recorded on the recordable region, and a third track from the beginning of the recordable region is selected in the case that it is third-repeatedly recorded on the recordable region.

Data is recorded on the designated track at operation S706.

Figure 8:
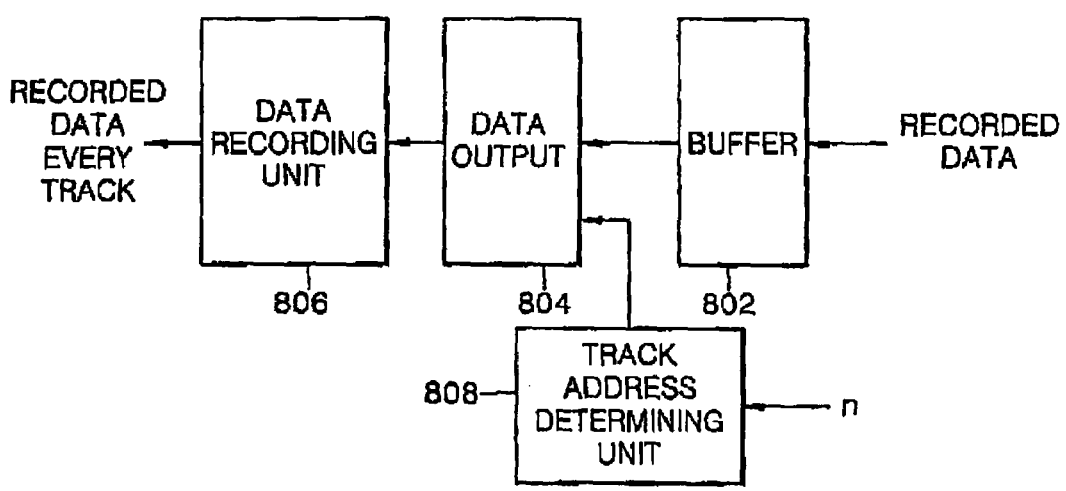
FIG. 8 is a block diagram of an apparatus for recording data using the method of recording data illustrated in FIGS. 6 and 7.

FIG. 8 is a block diagram illustrating a data recording apparatus using the data recording method of the present invention. Referring to FIG. 8, the data to be recorded is stored in a buffer 802. A data output unit 804 reads data of an amount to be recorded on the track from the buffer 802 with reference to an address of the recorded track to output the read data. The data output from the data output unit 804 is recorded on the disk 12 (FIG. 3) via the data recording section 806.

A track address determining unit 808 for determining the address of the recorded track determines an address of a next track to be recorded by a track determining algorithm with reference to a basic track interval n, where n is a constant greater than 2. The next track to be recorded is located by skipping at least one track from a track previously recorded. In the case that the track previously recorded with data is positioned at the end of the recordable region and thus, the next track to be recorded spaced apart from the previously recorded track by the designated interval, would be positioned out of the recordable region, the data recording returns to the beginning of the recordable region, and a track adjacent to the first track of the recordable region is designated as the next track.

The address of the track determined by the track address determining unit 808 for determining the address of recorded track is sent to the data output unit 804. The algorithm determining the next track to be recorded at the tract address determining unit 808 is recognized by the hard disk drive. Such an algorithm is also used when the hard disk drive reads the data from the disk.

The data recording method of the present invention is distinguished from a conventional interleaving method. The data interleaving method interleaves an order of blocks in a data frame comprising a plurality of blocks or between the data frames, so as to prevent a burst error.

The recording method of the present invention records data on a track skipping at least one track, regardless of the data frame, thereby providing robustness to the ATE and OTE.

In addition, the recording method of the present invention may be utilized with the conventional interleaving method.

The recording method of the present invention may be performed on the entire disk, or may be performed on a specific zone, if necessary. For example, since the entire capacity of the hard disk drive is seldom used and data is recorded from an outer diameter to an inner diameter of the disk, the recording method of the present invention may be applied to only an outer zone of the disk, i.e., a predetermined number of tracks closest to the outer diameter of the disk.

The present invention may be accomplished by a method, an apparatus, a system, and the like. If the present invention is performed by software, the present invention necessarily comprises code segments for executing a necessary operation. Programs or code segments may be stored in a processor-readable medium, or may be sent by a computer data signal combined with a carrier wave via a transferring medium or communication network. The processor-readable medium includes any medium capable of storing or sending information. Examples of the processor-readable medium are an electronic circuit, a semiconductor memory device, a ROM, a flash memory, an erasable ROM, a floppy disk, an optical disk, a hard disk, an optical fiber medium, a radio frequency (RF) network, and the like. The computer data signal includes any signal, which can be transmitted through a transmission medium, such as an electronic network channel, an optical fiber, air, an electromagnetic field, an RF network, and the like.

As described above, according to a data recording method of a hard disk drive of the present invention, when data is recorded on a track, it is recorded skipping at least one track so that the data to be recorded has robustness to ATE and OTE.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of recording data on a hard disk including a plurality of tracks, the method comprising:
   recording data on one of the tracks; and
   determining an address of a next track to be recorded with the data, the next track being located more than one track away from the previously recorded track, so that the recorded data has robustness to adjacent track erasure and overwrite erasure.

2. The method of claim 1, wherein:
   where the previously recorded track is positioned at an end of a recordable region, the recording of the data returns to a beginning of the recordable region, and a track adjacent to the a first recorded track of the recordable region is determined as the next track to be recorded.

3. The method of claim 1, wherein:
   where the previously recorded track is positioned near an end of a recordable region, the recording of data returns to a beginning of the recordable region, and an unrecorded track nearest a first recorded track of the recordable region is determined as the next track to be recorded.

4. The method of claim 3, wherein the recordable region comprises all the tracks on the disk.

5. The method of claim 3, wherein the recordable region comprises a predetermined number of the tracks on the disk.

6. The method of claim 5, wherein the disk comprises a plurality of recordable regions.

7. An apparatus for recording data on a hard disk drive, the apparatus comprising:
   a buffer buffering data to be recorded;
   a data output unit reading the buffered data to be recorded and outputting the buffered data with reference to an address of a next track to be recorded; and
   a track address determining unit determining the address of the next track to be recorded track, in which the next track to be recorded is located more than one track away from a previously recorded track, so that the recorded data has robustness to adjacent track erasure and overwrite erasure.

8. The apparatus of claim 7, wherein:
   where the previously recorded track is positioned near an end of a recordable region, the recording of data returns to a beginning of the recordable region, and an unrecorded track nearest a first recorded track of the recordable region is determined as the next track to be recorded.

9. The apparatus of claim 8, wherein the recordable region comprises all the tracks on the disk.

10. The apparatus of claim 8, wherein the recordable region comprises a predetermined number of the tracks on the disk.

11. The apparatus of claim 10, wherein the recordable region is located on an outer portion of the disk.

12. The apparatus of claim 10, wherein the disk comprises a plurality of the recordable regions.

13. A computer-readable storage medium storing a program for executing a method of recording data on a hard disk including a plurality of tracks, the method comprising:
   recording the data on one of the tracks; and
   determining an address of a next track to be recorded with the data, the next track being located more than one track away from the previously recorded track, so that the recorded data has robustness to adjacent track erasure and overwrite erasure.

14. The computer readable storage medium of claim 13, wherein:
   where the previously recorded track is positioned at an end of a recordable region, the recording of data returns to a beginning of the recordable region, and a track adjacent to the a first recorded track of the recordable region is determined as the next track to be recorded.

15. The computer readable storage medium of claim 13, wherein:
where the previously recorded track is positioned near an end of a recordable region, the recording of data returns to a beginning of the recordable region, and an unrecorded track nearest a first recorded track of the recordable region is determined as the next track to be recorded.

16. The computer readable storage medium of claim 15, wherein:
the recordable region comprises all the tracks on the disk.

17. The computer readable storage medium of claim 15, wherein:
the recordable region comprises a predetermined number of the tracks on the disk.

18. The computer readable storage medium of claim 17, wherein:
the recordable region is located on an outer portion of the disk.

19. The computer readable storage medium of claim 17, wherein:
the disk comprises a plurality of the recordable regions.

* * * * *